(12) United States Patent
Tsung

(10) Patent No.: US 6,335,503 B1
(45) Date of Patent: Jan. 1, 2002

(54) METHOD FOR MANUFACTURING FORGING DIE FOR MAKING NET FORMED GEARS WITH PREDETERMINED TOOTH CONTACT AREA

(75) Inventor: Wei-Jiung Tsung, Fort Wayne, IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/579,442

(22) Filed: May 26, 2000

(51) Int. Cl.[7] ............................................. B23H 9/00
(52) U.S. Cl. ................... 219/69.17; 219/69.15
(58) Field of Search ................... 219/69.17, 69.15, 219/69.1; 29/893.36, 893.37; 700/159, 162

(56) References Cited

U.S. PATENT DOCUMENTS

| 3,595,130 | A | * | 7/1971 | Maker |
| 4,627,770 | A | | 12/1986 | Kotthaus |
| 4,825,715 | A | | 5/1989 | Buczek et al. |
| 5,271,289 | A | | 12/1993 | Baxter, Jr. |
| 5,545,871 | A | * | 8/1996 | Carr |
| 5,610,994 | A | | 3/1997 | Stadfeld et al. |
| 5,662,438 | A | * | 9/1997 | Wiener et al. |
| 6,064,027 | A | * | 5/2000 | Santi |
| 6,129,793 | A | * | 10/2000 | Tan et al. |
| 6,204,466 | B1 | * | 3/2001 | Tabor |

* cited by examiner

Primary Examiner—Blaine Copenheaver
Assistant Examiner—Jonathan Johnson
(74) Attorney, Agent, or Firm—Liniak, Berenato, Longacre & White

(57) ABSTRACT

A method for determining a conjugated gear tooth contact surface of a gear having a predetermined gear mesh contact area. Also, a method for making a forging die for manufacturing gears having the predetermined gear mesh contact area is disclosed. The method includes the steps of designing the gear having the predetermined gear mesh contact area, designing an electrode for an electric discharge machining using CAD/CAM device, manufacturing the electrode, and manufacturing the forging die employing the electric discharge machining process.

24 Claims, 8 Drawing Sheets

METHOD FOR MANUFACTURING FORGING DIE FOR MAKING NET FORMED GEARS WITH PREDETERMINED TOOTH CONTACT AREA

FIELD OF THE INVENTION

The present invention relates to method for manufacturing gears in general, and particularly to a method for manufacturing net formed (straight bevel) gears having a predetermined tooth contact surface.

BACKGROUND OF THE INVENTION

Straight bevel gears are used for many automotive applications, such as differential gearing. Conventionally, the straight bevel gears of the prior art have tooth surfaces designed in the form of involute or octoid. Substantially the whole tooth surfaces of the conventional straight bevel gears are adapted to engage a tooth surface of a conjugated gear. Knowledge of the exact pattern of the tooth contact area is extremely important for engineers designing various gear mechanisms, such as differentials, because the size and position of the tooth contact area determines a gear tooth load and influences the operation of the gear mechanism. However, the prior art provides no means to predetermine the gear tooth contact area of the conjugated gears.

Currently, gear manufacturers employ a number of various methods for making gears. Recently, forging technology has achieved tremendous development and become very popular. Compared to machining, forging has its advantages of improving the product quality by achieving a high stiffness in the material without cutting the material flow lines, good surface condition at the formed part, and work hardening that increases wear resistance, and quick cycle time suitable for mass production.

Forging die design is essential for the manufacturing of the gear because it determines the shape of the gear and, thus, a meshing gear contact area and performance of the gearing incorporating this gear. Currently, forging dies for straight bevel gears are generated by a gear cutter and gear generating machine. Thus, gear tooth contact surface of the straight bevel gear is determined by a profile of the cutter and gear machine setting. It is well known to those skilled in the art that the tooth contact surface of the gear made by cutting on a gear-cutting machine is very difficult to control due to rigidity of the cutting machine and cutter errors. Therefore, it is practically impossible to control the gear tooth contact surface. The resulting gear tooth contact surface may be of any shape and configuration.

For forged gears that use cut gears as an electrode for making a gear forging die, problems, similar to described above, exist.

SUMMARY OF THE INVENTION

The present invention alleviates the drawbacks of the prior art.

The present invention provides a method for designing gear tooth profiles having a predetermined gear tooth contact area (both size and location). An important element of this invention is a method for modifying a conventional gear tooth surface for determining a new modified gear tooth surface having the predetermined gear tooth contact area. This method includes the steps of: (a) defining a conventional tooth working surface, (b) defining the predetermined gear tooth contact area, and (c) modifying the conventional tooth working surface outside the predetermined gear tooth contact area to determine a modified tooth working surface having the predetermined gear mesh contact area The conjugated gears manufactured in accordance with the present invention provide reduced stress concentration and noise level, improved durability over the current designs, and are less sensitive to misalignment. The present invention discloses mathematical equations determining the position of any point on the modified surface of the gear tooth.

In accordance with the preferred embodiment of the present invention, the bevel gear is manufactured by die forging. The method for manufacturing the gear-forging die is contemplated in the present invention. This method includes the steps of: (a) defining a conventional tooth working surface, (b) defining the predetermined gear tooth contact area, (c) modifying the conventional tooth working surface outside the predetermined gear tooth contact area to determine a modified tooth working surface having the predetermined gear mesh contact area, (d) designing a gear having the gear tooth surface as determined in the previous step; (e) designing an electrode for an electric discharge machining (EDM) on a CAD/CAM device using numerical data from the step (d), (f) manufacturing the electrode for the electric discharge machining, and (g) manufacturing the forging die employing the electric discharge machining process using the electrode. Thus, the present method eliminates the need in the gear cutter and gear cutting machines, and the forging die manufactured in accordance with the present method more closely corresponds to the profile of the originally designed gear.

BRIEF DESCRIPTION OF THE DRAWINGS

Other objects and advantages of the invention will become apparent from a study of the following specification when viewed in light of the accompanying drawings, wherein.

DETAILED DESCRIPTION

Figure 1:
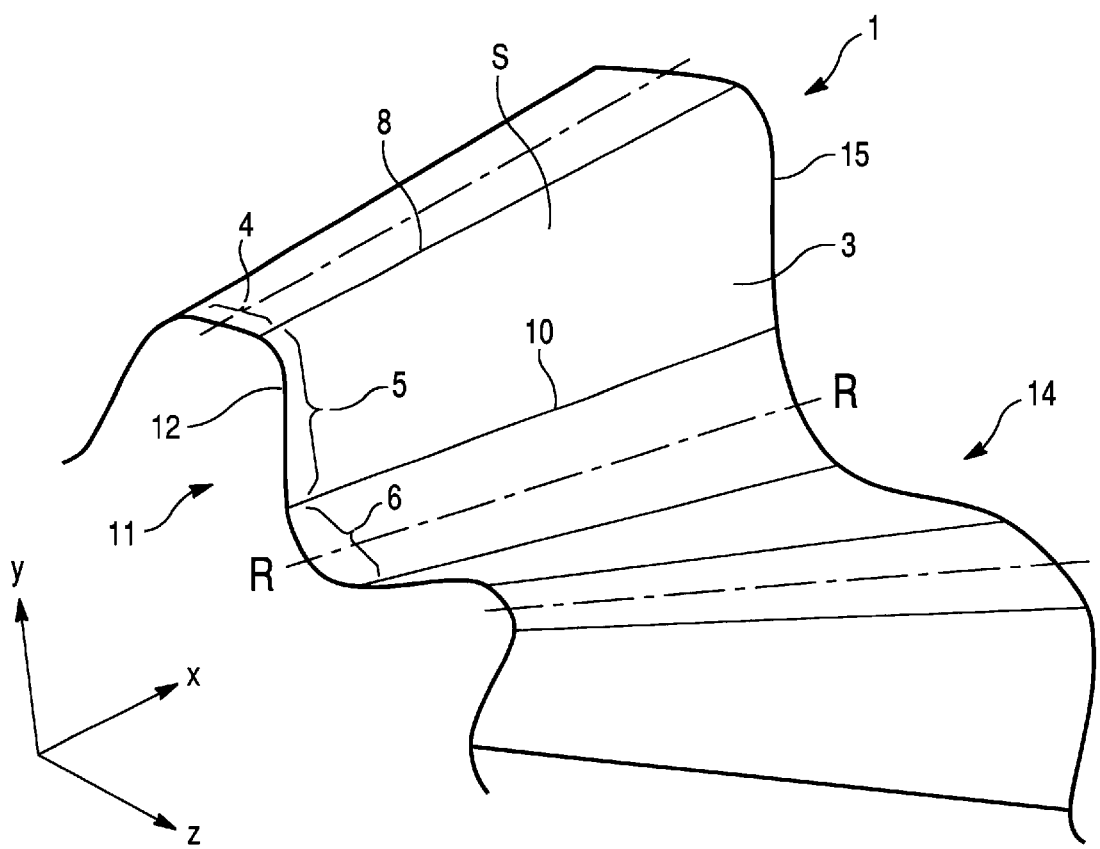
FIG. 1 is a fragmentary, exploded perspective view of a net formed straight bevel gear.

FIGS. 1 of the drawings illustrates a straight bevel gear 1 placed in a Cartesian coordinate system x-y-z. The straight bevel gear 1 has a plurality of teeth 3 forming a gear tooth surface S comprising a plurality of alternating top lands 4, working surfaces 5 and root surfaces 6. Gear face lines 8 define the top land 4. The root surface 6 includes a root line 10. In a longitudinal direction, the gear has a toe surface 11 defined by a toe line 12, and a heel surface 14 defined by a heel line 15. Therefore, the conventional tooth working surface 5 is defined by the face line 8 and the root line 10 in a transverse direction, and with the toe line 12 and the heel line 15 in a longitudinal direction. Substantially whole tooth working surface 5 of the conventional bevel gear of the prior art represents a potential contact surface with a corresponding meshing gear.

The present invention includes a method for determining a geometry of the gear working surface 5 conjugated straight bevel gears having a predetermined gear mesh contact area. The size and location of the contact area are determined based on the specific operating conditions of the conjugated gear, such as load, misalignment or heat distortion in the particular gear application, and are predetermined given values.

Figure 2B:
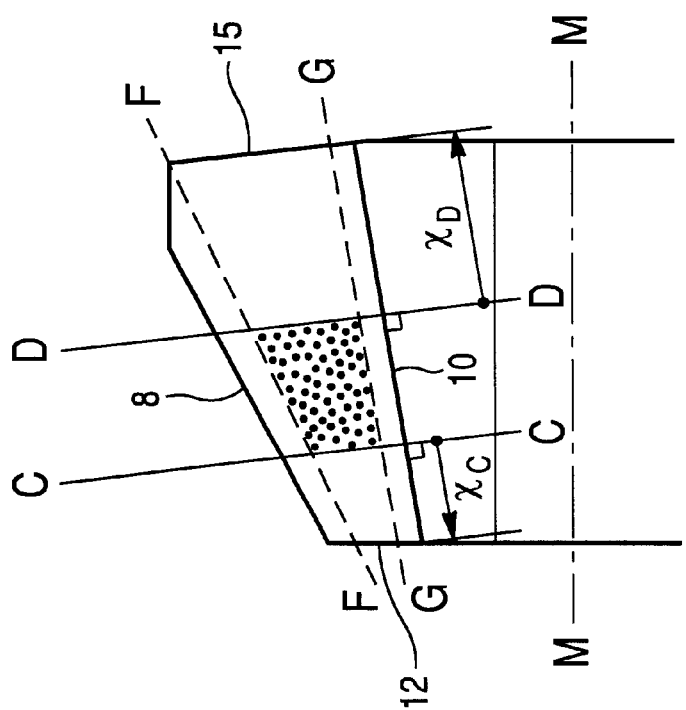
FIG. 2 illustrates boundary lines of a gear tooth contact area.
Figure 2A:
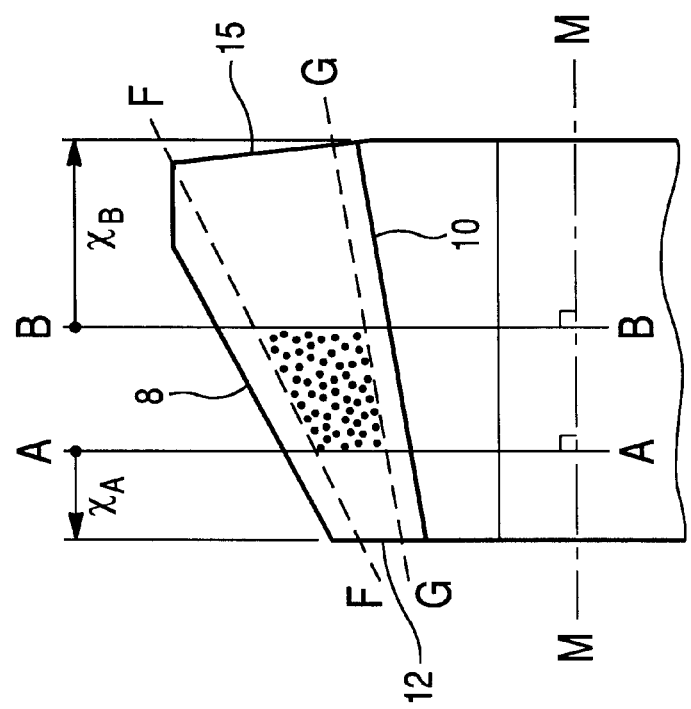

First, boundaries of the contact area are defined, as illustrated in FIGS. 2a and 2b.

The contact area in FIG. 2a is a shaded area defined by lines A—A, B—B, F—F and G—G. Both lines A—A and B—B are perpendicular to a longitudinal centerline gear axis M—M. For the sake of simplify, the gear 1 is located in the coordinate system x-y-z in such a way that a coordinate axis x coincides with the centerline axis M—M of the gear 1. The line F—F is parallel to the gear face line 8, and the line G—G is parallel to the root line 10.

Alternatively, as illustrated in FIG. 2b, the contact area is defined by lines C—C, D—D, F—F and G—G, wherein lines C—C and D—D are perpendicular to the root line 10.

Location of the lines A—A and B—B is determined as following. The line A—A is determined by a distance $x_A$, which is a distance from the gear toe surface 12 to the line A—A along the gear axis M—M. The distance $x_A$ is a predetermined given value. Correspondingly, the line B—B is determined by a distance $x_B$, which is a distance from the gear heel surface 15 to the line B—B along the gear axis M—M. The distance $x_B$ is a predetermined given value.

Figure 3:
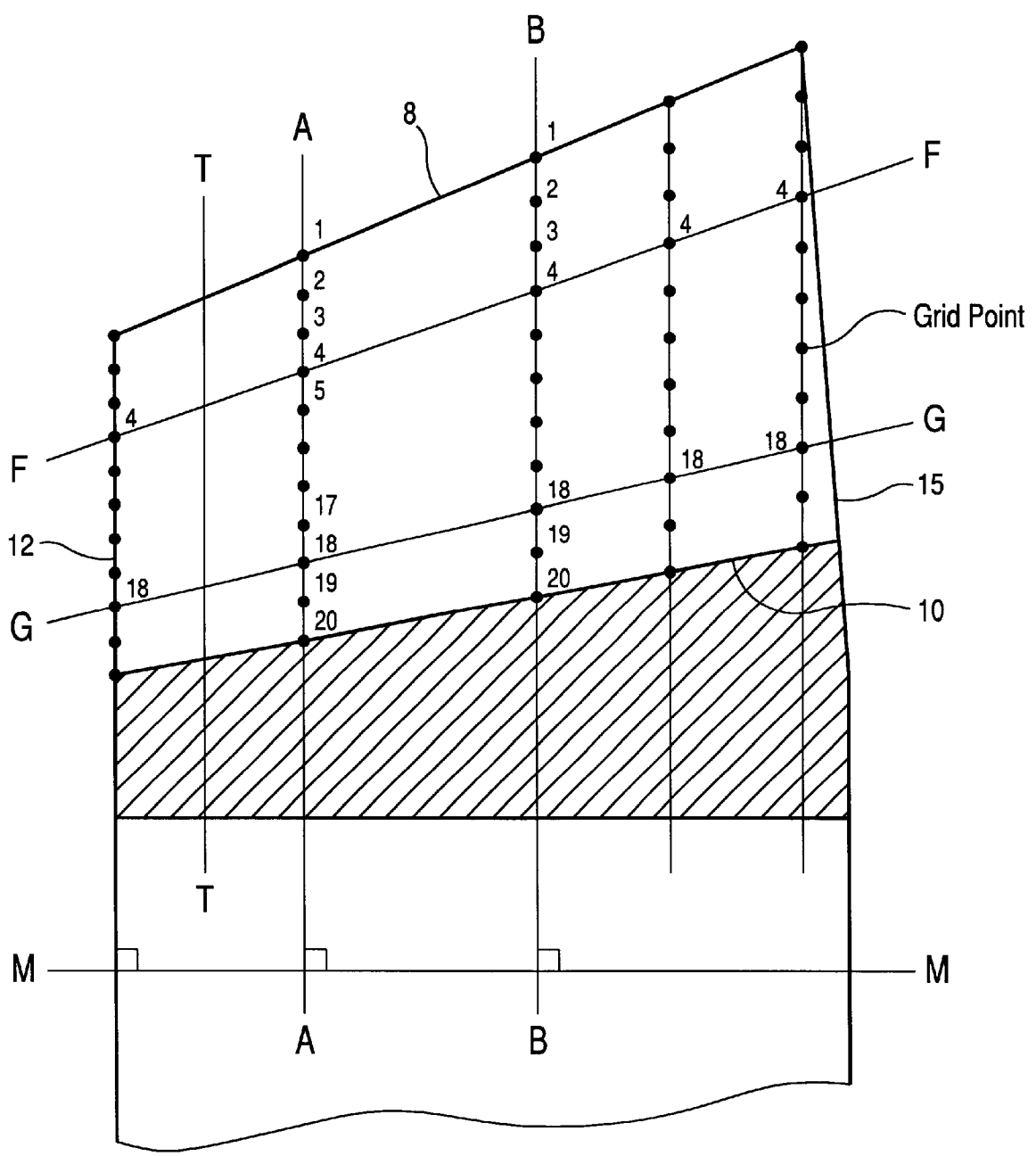
FIG. 3 illustrates a procedure for defining the boundary lines of a gear tooth contact area.

Location of the lines A—A and B—B are determined as follows. In accordance with the present invention, the gear tooth surface S is intersected with a plurality of straight lines perpendicular to the gear axis M—M forming a plurality of transverse sections lines T—T representing the gear tooth surface S, as illustrated in FIG. 3. The gear tooth surface may be represented by as many numbers of transverse sections as needed. Each transverse section line T—T is divided by a certain number of equally spaced grid points, as illustrated in FIG. 3. Spacing between the grid points for different section may be different, as a gear tooth height is not constant value and differs for various transverse section lines. In accordance with the preffered embodiment of the present invention, shown in FIG. 3, 20 grid points are used for each transverse section line of the gears tooth surface S. However, the number of grid points for each transverse section line may vary. Thus, the number of grid points for each transverse section line of the gears tooth surface S is a known given number.

The location of the lines F—F and G—G are determined as follows. The number of the grid points away from the face line K—K is chosen depending on the operating conditions of the particular conjugated pair of gears, which determines the location of the line F—F (the grid point #4, as illustrated in FIG. 3). Then the grid points #4 on each transverse section line of the gears tooth surface S is connected, thus forming the line F—F.

Similarly, the location of the line G—G is determined by choosing the number of grid points away from the root line H—H (the grid point #18, as illustrated in FIG. 3). Then the grid points #18 on each transverse section line of the gear tooth surface S is connected, thus forming the line G—G. Thus, the predetermined gear tooth contact area is determined.

Once the boundaries of the predetermined contact area are selected, the conventional gear tooth surface S outside the predetermined gear tooth contact area is modified so that after the modification only the predetermined contact area is in contact with the second conjugated gear.

A variable $\delta$ generally represents an amount of modification of the conventional gear tooth surface outside the predetermined contact area. The general polynomial equation that determines the amount of modification $\delta$ of the gear tooth surface at the distance x from the boundary line of the predetermined contact area, is as follows:

$$\delta = C_0 + C_1 x + C_2 x^2 + C_3 x^3 + \ldots + C_n x^n, \tag{1}$$

where $C_0, C_1, C_2, C_3, \ldots C_n$ are coefficients that are to be determined.

Figure 4A:
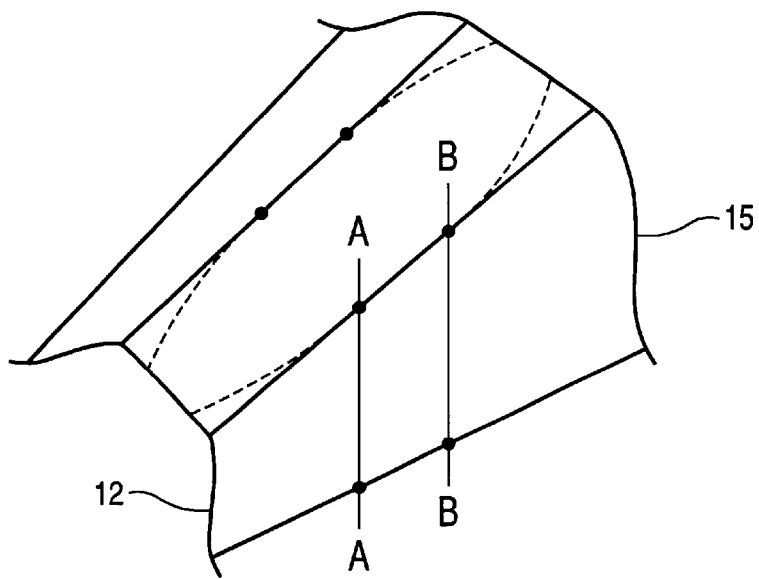
FIGS. 4a and 4b illustrates a conventional gear tooth working surface modified in accordance with the present invention for a portion between a toe line and a heel line.

First, the portion between the toe line 12 and the boundary line A—A of the tooth working surface of the conventional gear is modified, as illustrated in FIG. 4a, where dashed lines represent a face line of a modified gear tooth surface.

Figure 4B:
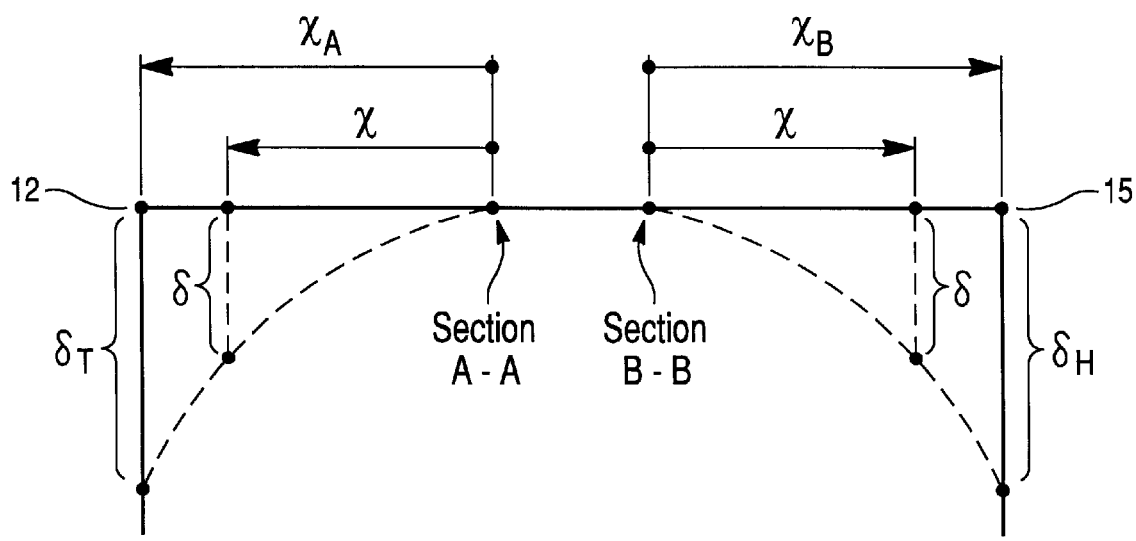

The equation (1) is employed to determine the modification amount, $\delta$, at any distance x, measured from the section A—A, as illustrated in FIG. 4b.

It is well known that in order to solve the $n^{th}$ order polynomial (1), we need (n+1) known given locations, x, and the amount of associated modification, $\delta$, to determine the (n+1) coefficients C.

For the sake of simplicity, a simplified $n^{th}$ order polynomial and only the end locations can be used, the section A—A and the toe line 12, to determine the coefficients of polynomial equation (1). If we set $$C_1 = C_2 = C_3 = \ldots = C_{n-1} = 0, \tag{2}$$

we obtain $$\delta = C_0 + C_n x^n \tag{3}$$

where n =1, 2, 3, . . . , N (any positive integer$\neq$0).

An example of the $n^{th}$ order polynomial equation (3), as presented above, will be used to explain this method.

The equation (3) has only two coefficients C with two known locations, and the modification amount, the coefficients $C_0$ and $C_n$ can be determined.

With two given known locations and amount of modification at (1) the section A—A with x=0 and $\delta$=0, and (2) the toe side with x=$x_A$ and $\delta=\delta_T$. It should be noted that $x_A$, as illustrated in FIG. 4b, is the distance defining the location of the toe line 12 measured from the section A—A, which is a given known value, and $\delta_T$ is a modification amount at the distance $x_A$, which is a given known value predetermined in accordance with the operational conditions of the conjugated gear. When substitute these values into the equation (3), it yields $$0 = C_0 + C_n \cdot (0)^n = C_0 \tag{4}$$

$$\delta_T = C_0 + C_n \cdot x_A^n = C_n \cdot x_A^n \tag{5}$$

Hence, $$C_n = \delta_T / x_A^n \quad (6)$$

and $$C_0 = 0 \quad (7)$$

So, the coefficients of the equation (3) are determined, and for any point x the amount of the modification δ can be determined from the equation (3), and is expressed by the following equation:

$$\delta = (\delta_T \cdot x^n) / x_A^n \quad (8)$$

Similarly, for the portion of the gear tooth surface S between the section B—B and the heel line 15, the amount of the modification δ can be determined using above described method. As illustrated in FIG. 4*b*, $x_B$ is the distance defining the location of the heel line 15 measured from the section B—B, which is a given known value. $\delta_H$ is a modification amount at the distance $x_B$, which is a given known value predetermined in accordance with the operational conditions of the conjugated gear. x is an arbitrary point measured from the section B—B, and the δ is an associated amount of modification expressed by the following equation:

$$\delta = (\delta_H \cdot x^n) / X_B^n \quad (9)$$

Figure 5A:
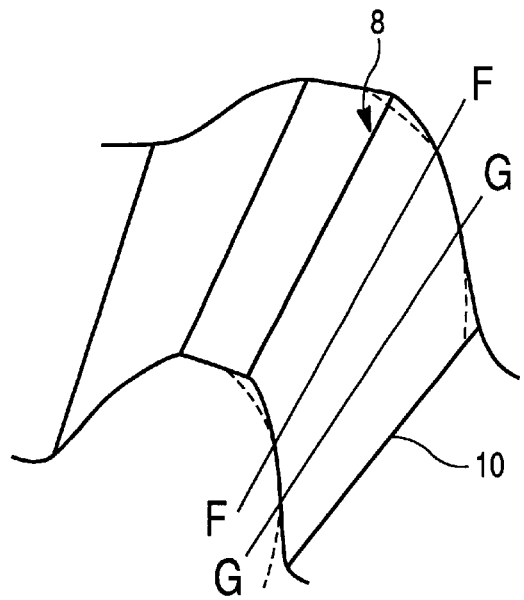
FIGS. 5a and 5b illustrates a conventional gear tooth working surface modified in accordance with the present invention for a portion between a face line and a root line.

The method for determining the modification between the section G—G and the root line 10, is explained as below with the reference to FIGS. 5*a* and 5*b*, where dashed lines represent modified toe and heel lines.

Figure 5B:
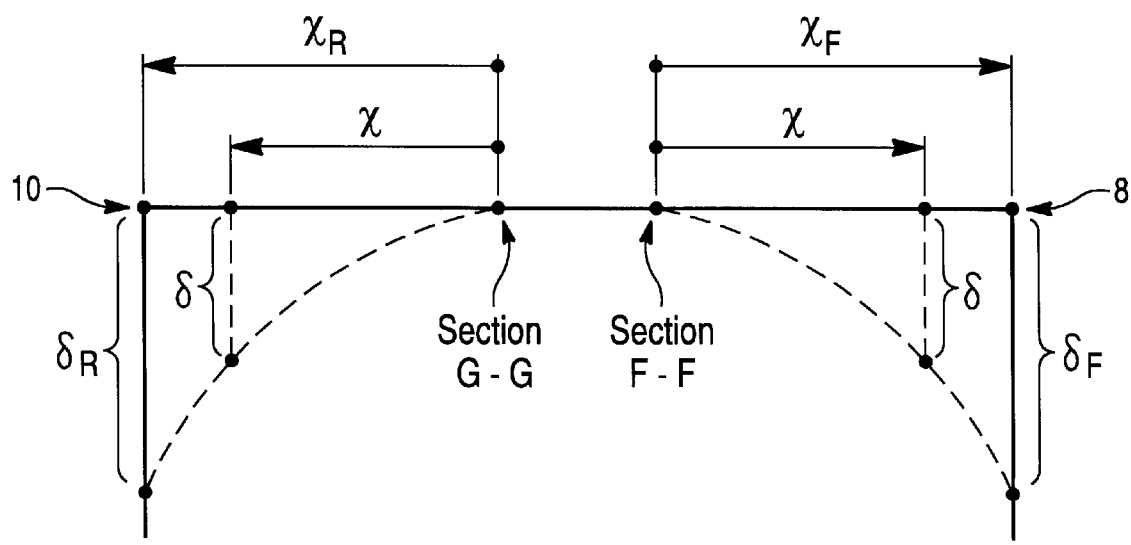

The FIG. 5*b* illustrates the given known locations and the corresponding amount of modification, where (1) $X_R$ is the location on the root line 10 measured from the section G—G, and $\delta_R$ is the corresponding amount of modification, they are given known values;

(2) at the section G—G, x=0 and δ=0;

(3) x is an arbitrary point between the section G—G and the root line, and δ is its corresponding amount of modification.

The same equations as used to determine the contact pattern between the sections A—A and the toe side (i.e. equations 1–3 and 8), may be used to determine the amount of modification δ between the section G—G and the root line 10, which in this case is expressed by the following equation:

$$\delta = (\delta_R \cdot x^n) / x_R^n \quad (10)$$

The modification between the section F—F and the face line 8 is described with the reference to FIG. 5*b*, where (1) $x_F$ is the location on the face line 8 measured from the section F—F, and $\delta_F$ is the corresponding amount of modification, they are given known values;

(2) at the section F—F, x=0 and δ=0;

(3) x is an arbitrary point between the section F—F and the face line, and δ is its corresponding amount of modification which is to be determined.

The same procedures as used above to determine the contact pattern between the sections A—A and the toe side, can be used to determine the amount of modification δ between the boundary line F—F and the face line 10, which in this case is expressed by the following equation:

$$\delta = (\delta_F \cdot x^n) / x_F^n. \quad (11)$$

As it was noted above, the present invention is the method for determining the gear tooth contact pattern of the conjugated bevel gears. It is generally accepted terminology in the art, that the conjugated gear with less teeth number is called a pinion mate, and the conjugated gear with more teeth number is called a side gear.

The following combinations of the surface modification procedures can be applied to the pinion mates and the side gears, respectively:

(1) the modification applied to the gear tooth surface of the pinion mate for the portion between the toe side and the heel side, and the modification applied to the gear tooth surface of the side gear for the portion between the root line and the face line;

(2) the modification applied to the gear tooth surface of the side gear for the portion between the toe side and the heel side, and the modification applied to the gear tooth surface of the pinion mate for the portion between the root line and the face line;

(3) the modification applied only to the gear tooth surface of the pinion mate first for the portion between the toe side and the heel side, then for the portion between the root line and the face line, no modification is applied to the gear tooth surface of the side gear;

(4) the modification applied only to the gear tooth surface of the side gear first for the portion between the toe side and the heel side, then for the portion between the root line and the face line, no modification is applied to the gear tooth surface of the pinion mate.

The next step is to determine the contact pattern of the modified gear tooth surface of the conjugated gear.

Figure 6:
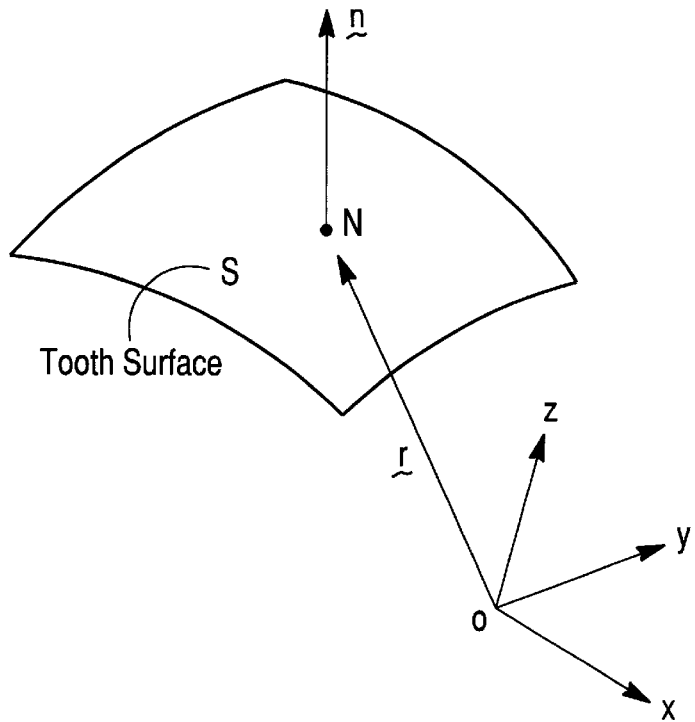
FIG. 6 illustrates a position of an arbitrary point N on a new modified gear tooth surface in a Cartesian coordinate system x-y-z.

It is well known in Theoretical Mechanics that any point on the gear surface S may be represented by a position vector r and a unit normal vector n with respect to the Cartesian coordinate system x-y-z when the axis x coincides with the gear axis M—M. Based on this provision, a position vector of an arbitrary point N on the new modified tooth surface, illustrated in FIG. 6, is determined by the following equation:

$$\underline{r}^{(N)} = \underline{r}^{(P)} + \delta \cdot \underline{n} \quad (12)$$

where $\underline{r}^{(N)}$ is the position vector of the arbitrary point N on the new modified tooth surface;

P is an arbitrary point on the gear tooth surface before modification;

$\underline{r}^{(P)}$ is the position vector of the arbitrary point P, known;

δ is the modification amount of the arbitrary point P on the gear tooth surface, can be determined by the method described hereinabove;

$\underline{n}$ is a unit normal vector of the point P represented in the Cartesian coordinate system x-y-z;

δ·$\underline{n}$ represents the modification amount along the unit normal direction for the arbitrary point P on the gear tooth surface.

Figure 7:
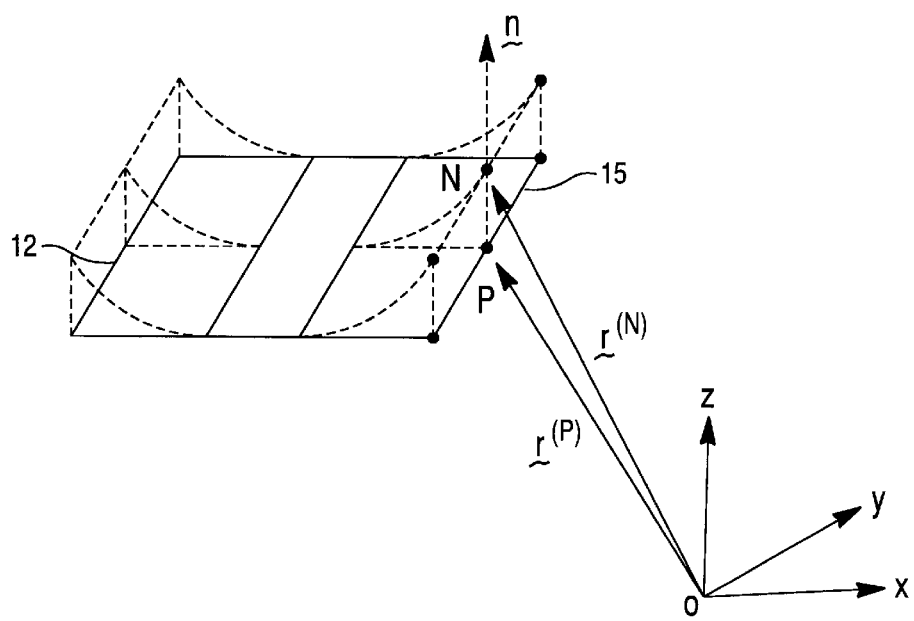
FIG. 7 is the modified gear tooth working surface for a portion between a toe line and a heel line in the Cartesian coordinate system x-y-z.
Figure 8:
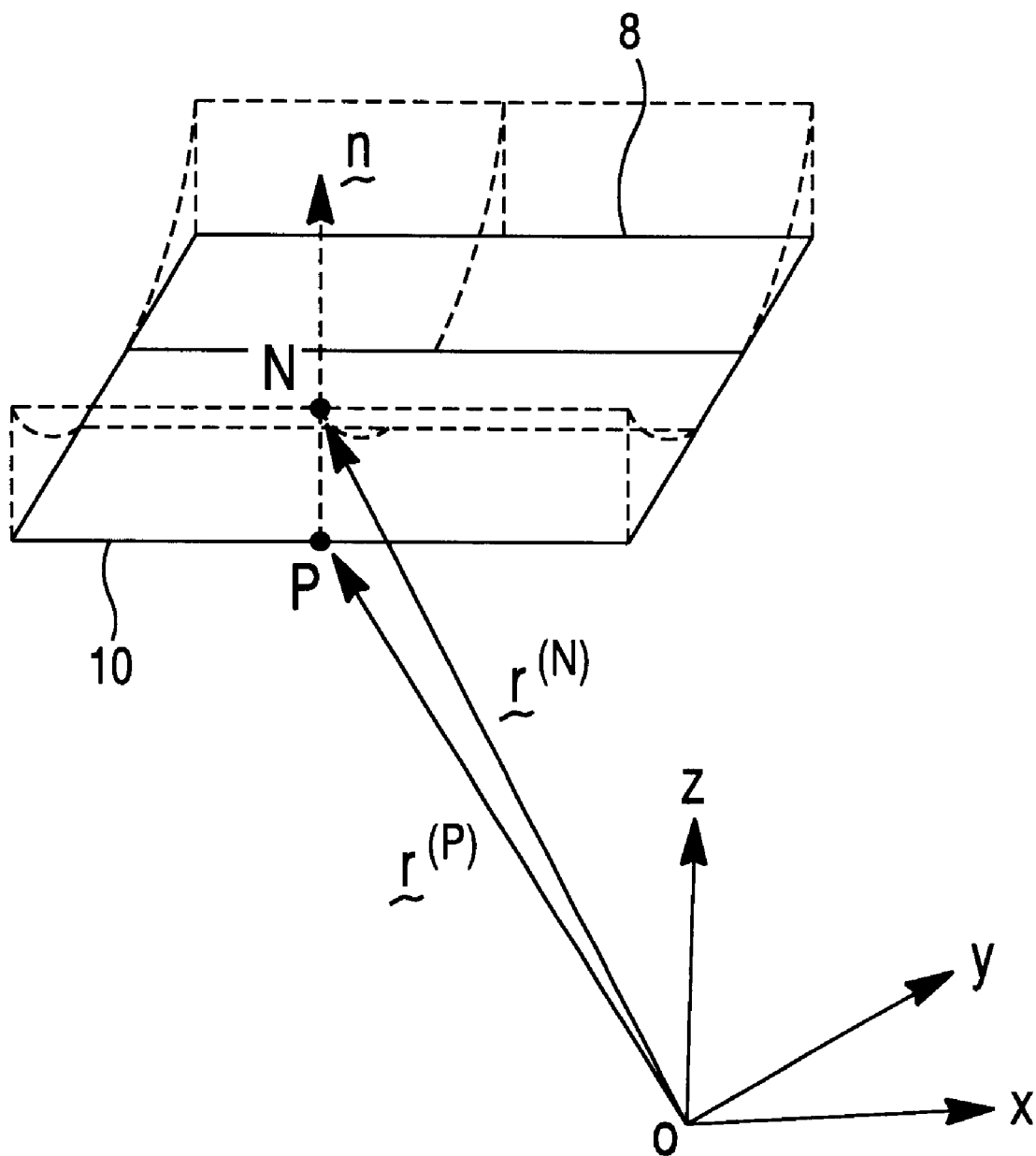
FIG. 8 is the modified gear tooth working surface for a portion between a face line and a root line in the Cartesian coordinate system x-y-z.

FIG. 7 illustrates the new modified gear tooth surface for the portion between the toe side and the heel side. Similarly modified gear tooth surface for the portion between the root line and the face line is illustrated in FIG. 8.

In accordance with the present invention, the equation (12) is used to determine the new modified position of a series of points on the gear tooth surface between the boundary lines of the gear tooth contact area A—A, B—B and F—F, G—G. Thus, a new modified gear tooth working surface having the predetermined tooth contact area is defined.

Figure 9:
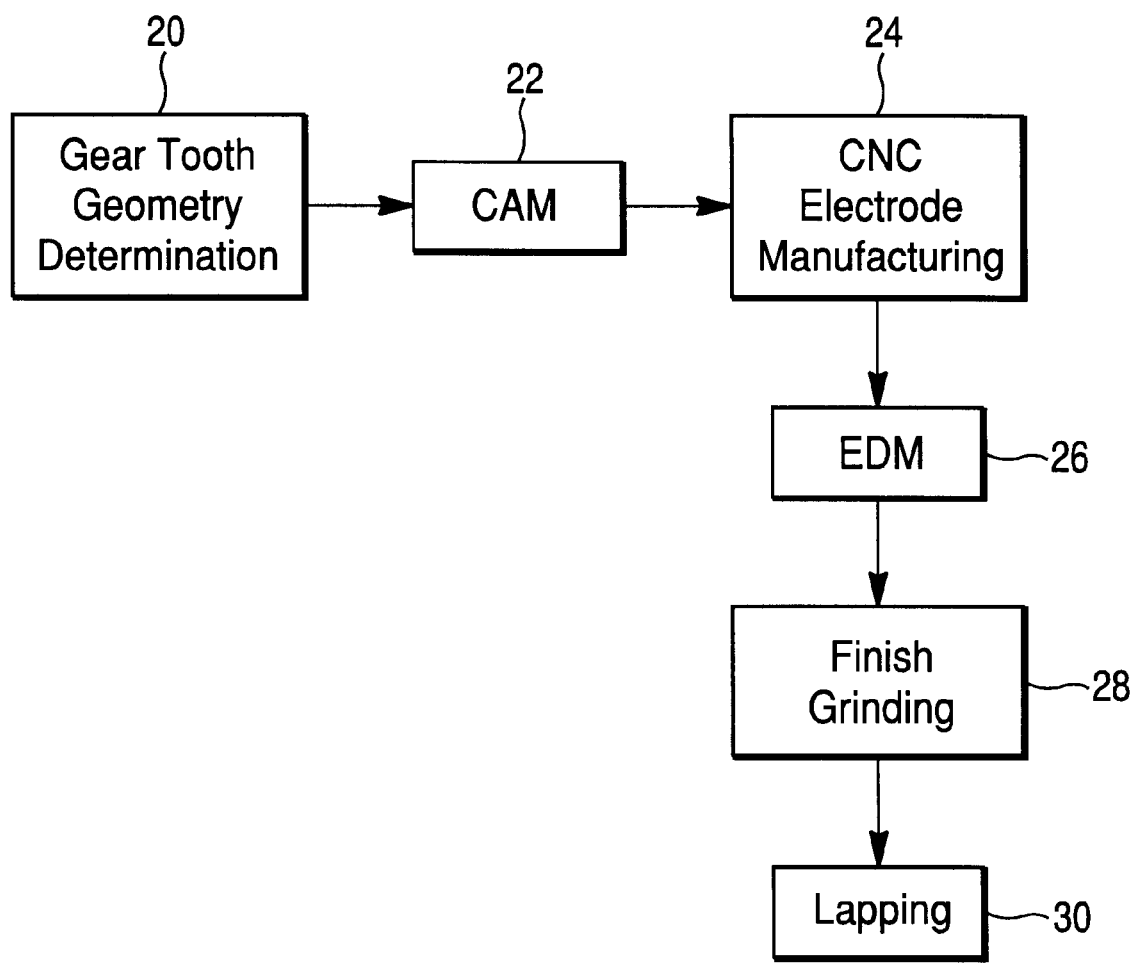
FIG. 9 is a flow chart of a method for manufacturing a gear-forging die.

Another aspect of the present invention is a method for manufacturing a forging die for making net formed gears having the predetermined gear tooth contact area, depicted schematically in FIG. 9.

The first step 20 of this method is to determine the gear tooth working surface having the predetermined tooth contact area using the method described in detail above.

The next step 22 in the process of manufacturing the forging die is using a Computer Aided Manufacturing (CAM) device for designing an electrode for an Electrical Discharge Machining (EDM) apparatus. The CAM device uses numerical data regarding the gear tooth surface with the predetermined gear tooth contact pattern as described above, thus, eliminating the step of manufacturing a master gear by a special gear cutter.

Then, the CAM data is transferred to a Computer Numerical Control (CNC) machine tool for manufacturing the electrode (step 24). Later, the manufactured electrode is used in the conventional EDM process 26 well known to those skilled in the art. Finally, finish grinding 28 and lapping 30 are applied to obtain a mirror-finished surface to the die.

Therefore, the novel method for manufacturing the forging die for making straight bevel gears with predetermined gear tooth contact area of the present invention as disclosed in the above-described embodiment allows to make straight bevel gears with predetermined gear tooth contact area providing reduced stress concentration and reduced noise level. When used in manufacturing, the present invention reduces the production cost and improves the quality of the manufacturing.

The foregoing description of the preferred embodiment of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiment disclosed hereinabove was chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A method for determining a geometry of a tooth working surface of a conjugated gear having a predetermined gear tooth contact area, said method including the steps of:
   (a) defining a conventional tooth working surface;
   (b) defining said predetermined gear tooth contact area within said conventional tooth working surface;
   (c) modifying said conventional tooth working surface to define a modified tooth working surface having said predetermined gear tooth contact area,
   wherein said conjugated gear has a longitudinal axis and said tooth working surface of said conjugated gear is defined by a face line and a root line defining a tooth height and by a toe line and a heel line defining a tooth depth, and the step (b) includes the steps of:
      selecting a first boundary line of said predetermined gear tooth contact area perpendicular to said gear axis and located at a predetermine distance from said toe line;
      selecting a second boundary line of said predetermined gear tooth contact area perpendicular to said gear axis and located at a predetermine distance from said heel line (15);
      selecting a third boundary line of said predetermined gear tooth contact area parallel to said face line and located at a predetermine distance from said face line;
   selecting a forth boundary line of said predetermined gear tooth contact area parallel to said root line and located at a predetermine distance from said root line.

2. A method for determining a geometry of a tooth working surface of a conjugated gear having a predetermined gear tooth contact area, said method including the steps of:
   (a) defining a conventional tooth working surface;
   (b) defining said predetermined gear tooth contact area within said conventional tooth working surface;
   (c) modifying said conventional tooth working surface to define a modified tooth working surface having said predetermined gear tooth contact area,
   wherein said conjugated gear has a longitudinal axis and said gear tooth working surface of said conjugated gear is defined by a face line and a root line defining a tooth height and by a toe line and a heel line defining a tooth depth, and the step (b) includes the steps of:
      selecting a first boundary line of said predetermined gear tooth contact area perpendicular to said root line and located at a predetermine distance from said toe line;
      selecting a second boundary line of said predetermined gear tooth contact area perpendicular to said root line and located at a predetermine distance from said heel line;
      selecting a third boundary line of said predetermined gear tooth contact area parallel to said face line and located at a predetermine distance from said face line;
      selecting a forth boundary line of said predetermined gear tooth contact area parallel to said root line and located at a predetermine distance from said root line.

3. The method for determining a geometry of a tooth working surface of a conjugated gear having a predetermined gear tooth contact area as defined in claim 1, wherein the location of said boundary lines is selected based on gear operating conditions, gear material, and/or quality of manufacturing.

4. The method for determining a geometry of a tooth working surface of a conjugated gear having a predetermined gear tooth contact area as defined in claim 2, wherein the location of said boundary lines is selected based on gear operating conditions, gear material, and/or quality of manufacturing.

5. The method for determining a geometry of a tooth working surface of a conjugated gear having a predetermined gear tooth contact area as defined in claim 1, wherein said modified gear tooth surface is determined in accordance with the following equations:

$$\underline{r}^{(P)} = \underline{r}^{(N)} + \underline{\delta},$$

where $\underline{r}^{(P)}$—a position vector of any arbitrary point P on said modified tooth working surface outside said predetermined gear tooth contact area represented in a Cartesian coordinate system x-y-z;

$\underline{r}^{(N)}$—a position vector of any arbitrary point N on said conventional tooth working surface outside said predetermined gear tooth contact surface represented in the Cartesian coordinate system x-y-z, known;

δ—an amount of modification of said arbitrary point N;

$\underline{n}$—a unit normal vector of said arbitrary point N represented in the Cartesian coordinate system x-y-z, known.

6. The method for determining a geometry of a tooth working surface of a conjugated gear having a predetermined gear tooth contact area as defined in claim 5, wherein the step (c) includes the steps of:

modifying said conventional tooth working surface between said toe line and said first boundary line, wherein said amount of modification δ is determined in accordance with the following equation:

$$\delta = (\delta_T \cdot x^n)/x_A^n$$

where $\delta_T$—an amount of modification of any point T located on said toe line, a predetermined given value;

$x_A$—a distance between said toe line and said first boundary line, a predetermined given value;

x—a distance from said first boundary line to said arbitrary point N, known, n—any positive integer≠0, and modifying said conventional tooth working surface between said heel line and said second boundary line, wherein said amount of modification δ is determined in accordance with the following equations:

$$\delta = (\delta_H \cdot x^n)/x_B^n$$

where $\delta_H$—an amount of modification of any point H located on said heel line, a predetermined given value;

$x_B$—a distance between said heel line and said second boundary line, a predetermined given value;

x—a distance from said second boundary line to said arbitrary point N, known;

n—any positive integer≠0.

7. The method for determining a geometry of a tooth working surface of a conjugated gear having a predetermined gear tooth contact area as defined in claim 5, wherein the step (c) includes the steps of:

modifying said conventional tooth working surface between said face line and said third boundary line, wherein said modification amount δ is determined in accordance with the following equations:

$$\delta = (\delta_F \cdot x^n)/x_F^n$$

where $\delta_F$—an amount of modification of any arbitrary point F located on said face line, a predetermined given value;

$x_F$—a distance between said face line and said third boundary line, a predetermined given value;

x—a distance from said third boundary line to said arbitrary point N, known;

n—any positive integer≠0, and modifying said conventional tooth working surface between said root line and said forth boundary line, wherein said amount of modification δ is determined in accordance with the following equations:

$$\delta = (\delta_R \cdot x^n)/x_R^n$$

where $\delta_R$—an amount of modification of any point R located on said root line, a predetermined given value;

$x_R$—a distance between said root line and said forth boundary line, a predetermined given value;

x—a distance from said forth boundary line to said arbitrary point N, known;

n—any positive integer≠0.

8. The method for determining a geometry of a tooth working surface of a conjugated gear having a predetermined gear tooth contact area as defined in claim 5, wherein the step (c) includes the steps of:

modifying said conventional tooth working surface between said toe line and said first boundary line, wherein said amount of modification δ is determined in accordance with the following equations:

$$\delta = (\delta_T \cdot x^n)/x_A^n$$

where $\delta_T$—an amount of modification of any arbitrary point T located on said toe line, a predetermined given value;

$x_A$—a distance between said toe line and said first boundary line, a predetermined given value;

x—a distance from said first boundary line to said arbitrary point N, known;

n—any positive integer≠0;

modifying the tooth working surface between said heel line and said second boundary line, wherein said modification amount δ is determined in accordance with the following equations:

$$\delta = (\delta_H \cdot x^n)/x_B^n$$

where $\delta_H$—an amount of modification of any point H located on said heel line, a predetermined given value;

$x_B$—a distance between said heel line and said second boundary line, a predetermined given value;

x—a distance from said second boundary line to said arbitrary point N, known;

n—any positive integer≠0;

modifying said conventional tooth working surface between said face line and said third boundary line, wherein said amount of modification δ is determined in accordance with the following equations:

$$\delta = (\delta_F \cdot x^n)/x_F^n$$

where $\delta_F$—an amount of modification of any point F located on said face line, a predetermined given value;

$x_F$—a distance between said face line and said third boundary line, a predetermined given value;

x—a distance from said third boundary line to said arbitrary point N, known;

n—any positive integer≠0, and modifying said conventional tooth working surface between said root line and said forth boundary line, wherein said amount of modification δ is determined in accordance with the following equations:

$$\delta = (\delta_R \cdot x^n)/x_R^n$$

where
- $\delta_R$—an amount of modification of any point R located on said root line, a predetermined given value;
- $x_R$—a distance between said root line and said forth boundary line, a predetermined given value;
- $x$—a distance from said forth boundary line to said arbitrary point N, known;
- $n$—any positive integer$\neq 0$.

9. The method for determining a geometry of a tooth working surface of a conjugated gear having a predetermined gear tooth contact area as defined in claim 2, wherein said modified gear tooth surface is determined in accordance with the following equations:

$$\underline{r}^{(P)} = \underline{r}^{(N)} + \delta \cdot \underline{n},$$

where
- $\underline{r}^{(P)}$—a position vector of any arbitrary point P on said modified tooth working surface outside said predetermined gear tooth contact area represented in a Cartesian coordinate system x-y-z;
- $\underline{r}^{(N)}$—a position vector of any arbitrary point N on said conventional tooth working surface outside said predetermined gear tooth contact surface represented in the Cartesian coordinate system x-y-z, known;
- $\delta$—an amount of modification of said arbitrary point N;
- $\underline{n}$—a unit normal vector of said arbitrary point N represented in the Cartesian coordinate system x-y-z, known.

10. The method for determining a geometry of a tooth working surface of a conjugated gear having a predetermined gear tooth contact area as defined in claim 9, wherein the step (c) includes the steps of:

modifying said conventional tooth working surface between said toe line and said first boundary line, wherein said amount of modification $\delta$ is determined in accordance with the following equation:

$$\delta = (\delta_T \cdot x^n)/x_A^n$$

where
- $\delta_T$—an amount of modification of any point T located on said toe line, a predetermined given value;
- $x_A$—a distance between said toe line and said first boundary line, a predetermined given value;
- $x$—a distance from said first boundary line to said arbitrary point N, known;
- $n$—any positive integer$\neq 0$, and modifying said conventional tooth working surface between said heel line and said second boundary line, wherein said amount of modification $\delta$ is determined in accordance with the following equations:

$$\delta = (\delta_H \cdot x^n)/x_B^n$$

where
- $\delta_H$—an amount of modification of any point H located on said heel line, a predetermined given value;
- $x_B$—a distance between said heel line and said second boundary line, a predetermined given value;
- $x$—a distance from said second boundary line to said arbitrary point N, known;
- $n$—any positive integer$\neq 0$.

11. The method for determining a geometry of a tooth working surface of a conjugated gear having a predetermined gear tooth contact area as defined in claim 9, wherein the step (c) includes the steps of:

modifying said conventional tooth working surface between said face line and said third boundary line, wherein said modification amount $\delta$ is determined in accordance with the following equations:

$$\delta = (\delta_F \cdot x^n)/x_F^n$$

where
- $\delta_F$—an amount of modification of any arbitrary point F located on said face line, a predetermined given value;
- $x_F$—a distance between said face line and said third boundary line, a predetermined given value;
- $x$—a distance from said third boundary line to said arbitrary point N, known;
- $n$—any positive integer$\neq 0$, and modifying said conventional tooth working surface between said root line and said forth boundary line, wherein said amount of modification $\delta$ is determined in accordance with the following equations:

$$\delta = (\delta_R \cdot x^n)/x_R^n$$

where
- $\delta_R$—an amount of modification of any point R located on said root line, a predetermined given value;
- $x_R$—a distance between said root line and said forth boundary line, a predetermined given value;
- $x$—a distance from said forth boundary line to said arbitrary point N, known;
- $n$—any positive integer$\neq 0$.

12. The method for determining a geometry of a tooth working surface of a conjugated gear having a predetermined gear tooth contact area as defined in claim 9, wherein the step (c) includes the steps of:

modifying said conventional tooth working surface between said toe line and said first boundary line, wherein said amount of modification $\delta$ is determined in accordance with the following equations:

$$\delta = (\delta_T \cdot x^n)/x_A^n$$

where
- $\delta_T$—an amount of modification of any arbitrary point T located on said toe line, a predetermined given value;
- $x_A$—a distance between said toe line and said first boundary line, a predetermined given value;
- $x$—a distance from said first boundary line to said arbitrary point N, known;
- $n$—any positive integer$\neq 0$;

modifying the tooth working surface between said heel line and said second boundary line, wherein said modification amount $\delta$ is determined in accordance with the following equations:

$$\delta = (\delta_H \cdot x^n)/x_B^n$$

where
- $\delta_H$—an amount of modification of any point H located on said heel line, a predetermined given value;
- $x_B$—a distance between said heel line and said second boundary line, a predetermined given value;
- $x$—a distance from said second boundary line to said arbitrary point N, known;
- $n$—any positive integer$\neq 0$;

modifying said conventional tooth working surface between said face line and said third boundary line, wherein said amount of modification δ is determined in accordance with the following equations:

$$\delta = (\delta_F \cdot x^n)/x_F^n$$

where
$\delta_F$—an amount of modification of any point F located on said face line, a predetermined given value;
$x_F$—a distance between said face line and said third boundary line, a predetermined given value;
x—a distance from said third boundary line to said arbitrary point N, known;
n—any positive integer≠0, and
modifying said conventional tooth working surface between said root line and said forth boundary line, wherein said amount of modification δ is determined in accordance with the following equations:

$$\delta = (\delta_R \cdot x^n)/x_R^n$$

where
$\delta_R$—an amount of modification of any point R located on said root line, a predetermined given value;
$x_R$—a distance between said root line and said forth boundary line, a predetermined given value;
x—a distance from said forth boundary line to said arbitrary point N, known;
n—any positive integer≠0.

13. A method for making a forging die for manufacturing a conjugated gear having a predetermined gear tooth contact area, said gear having a longitudinal axis and a plurality of tooth working surfaces each including said predetermined gear tooth contact area contacting a gear tooth contact surface of a meshing gear, said gear tooth working surface of said conjugated gear is defined by a face line and a root line defining a tooth height and by a toe line and a heel line defining a tooth depth, said method comprising the steps of:
(1) defining a conventional gear tooth working surface;
(2) defining a gear tooth contact area within boundaries of said conventional gear tooth working surface;
(3) modifying said conventional tooth working surface to define a modified gear tooth working surface having said predetermined gear tooth contact area;
(4) designing a conjugated gear having said tooth working surface as determined in the steps (1)–(3);
(5) designing an electrode for an electric discharge machining, said electrode being in the form of a facsimile of the conjugated gear determined in the step (2);
(6) manufacturing said electrode for the electric discharge machining, and
(7) manufacturing said forging die employing the electric discharge machining process using said electrode,
wherein the step (2) includes the steps of:
selecting a first boundary line of said predetermined gear tooth contact area perpendicular to said root line and located at a predetermine distance from said toe line;
selecting a second boundary line of said predetermined gear tooth contact area perpendicular to said root line and located at a predetermine distance from said heel line;
selecting a third boundary line of said predetermined gear tooth contact area parallel to said face line and located at a predetermine distance from said face line;
selecting a forth boundary line of said predetermined gear tooth contact area parallel to said root line and located at a predetermine distance from said root line.

14. A method for making a forging die for manufacturing a conjugated gear having a predetermined gear tooth contact area, said gear having a longitudinal axis and a plurality of tooth working surfaces each including said predetermined gear tooth contact area contacting a gear tooth contact surface of a meshing gear, said gear tooth working surface of said conjugated gear is defined by a face line and a root line defining a tooth height and by a toe line and a heel line defining a tooth depth, said method comprising the steps of:
(1) defining a conventional gear tooth working surface;
(2) defining a gear tooth contact area within boundaries of said conventional gear tooth working surface;
(3) modifying said conventional tooth working surface to define a modified gear tooth working surface having said predetermined gear tooth contact area;
(4) designing a conjugated gear having said tooth working surface as determined in the steps (1)–(3);
(5) designing an electrode for an electric discharge machining, said electrode being in the form of a facsimile of the conjugated gear determined in the step (2);
(6) manufacturing said electrode for the electric discharge machining, and
(7) manufacturing said forging die employing the electric discharge machining process using said electrode,
wherein the step (2) includes the steps of:
selecting a first boundary line of said predetermined gear tooth contact area perpendicular to said root line and located at a predetermine distance from said toe line;
selecting a second boundary line of said predetermined gear tooth contact area perpendicular to said root line and located at a predetermine distance from said heel line;
selecting a third boundary line of said predetermined gear tooth contact area parallel to said face line and located at a predetermine distance from said face line;
selecting a forth boundary line of said predetermined gear tooth contact area parallel to said root line and located at a predetermine distance from said root line.

15. The method for making a forging die for manufacturing a conjugated gear having a predetermined gear tooth contact area as defined in claim 13, wherein the location of said boundary lines is selected based on gear operating conditions, gear material, and/or quality of manufacturing.

16. The method for making a forging die for manufacturing a conjugated gear having a predetermined gear tooth contact area as defined in claim 14, wherein the location of said boundary lines is selected based on gear operating conditions, gear material, and/or quality of manufacturing.

17. The method for making a forging die for manufacturing a conjugated gear having a predetermined gear tooth contact area as defined in claim 13, wherein said modified gear tooth surface is determined in accordance with the following equations:

$$\underline{r}^{(P)} = \underline{r}^{(N)} + \delta \cdot \underline{n},$$

where
$\underline{r}^{(P)}$—a position vector of any arbitrary point P on said modified tooth working surface outside said predetermined gear tooth contact area represented in a Cartesian coordinate system x-y-z;
$\underline{r}^{(N)}$—a position vector of any arbitrary point N on said conventional tooth working surface outside said predetermined gear tooth contact surface represented in the Cartesian coordinate system x-y-z, known;

δ—an amount of modification of said arbitrary point N;

n—a unit normal vector of said arbitrary point N represented in the Cartesian coordinate system x-y-z, known.

18. The method for making a forging die for manufacturing a conjugated gear having a predetermined gear tooth contact area as defined in claim 17, wherein the step (3) includes the steps of:

modifying said conventional tooth working surface between said toe line and said first boundary line, wherein said amount of modification δ is determined in accordance with the following equations:

$$\delta = (\delta_T \cdot x^n)/x_A^n$$

where
- $\delta_T$—an amount of modification of any point T located on said toe line, a predetermined given value;
- $x_A$—a distance between said toe line and said first boundary line, a predetermined given value;
- x—a distance from said first boundary line to said arbitrary point N, known;
- n—any positive integer≠0, and modifying said conventional tooth working surface between said heel line and said second boundary line, wherein said amount of modification δ is determined in accordance with the following equations:

$$\delta = (\delta_H \cdot x^n)/x_B^n$$

where
- $\delta_H$—an amount of modification of any point H located on said heel line, a predetermined given value;
- $x_B$—a distance between said heel line and said second boundary line, a predetermined given value;
- x—a distance from said second boundary line to said arbitrary point N, known;
- n—any positive integer≠0.

19. The method for making a forging die for manufacturing a conjugated gear having a predetermined gear tooth contact area as defined in claim 17 wherein the step (3) includes the steps of:

modifying said conventional tooth working surface between said face line and said third boundary line, wherein said amount of modification δ is determined in accordance with the following equations:

$$\delta = (\delta_F \cdot x^n)/x_F^n$$

where
- $\delta_F$—an amount of modification of any point F located on said face line, a predetermined given value;
- $x_F$—a distance between said face line and said third boundary line, a predetermined given value;
- x—a distance from said third boundary line to said arbitrary point N, known;
- n—any positive integer≠0, and modifying said conventional tooth working surface between said root line and said forth boundary line, wherein said amount of modification δ is determined in accordance with the following equations:

$$\delta = (\delta_R \cdot x^n)/x_R^n$$

where
- $\delta_R$—an amount of modification of any point R located on said root line, a predetermined given value;
- $x_R$—a distance between said root line and said forth boundary line, a predetermined given value;
- x—a distance from said forth boundary line to said arbitrary point N, known;
- n—any positive integer≠0.

20. The method for making a forging die for manufacturing a conjugated gear having a predetermined gear tooth contact area as defined in claim 17, wherein the step (3) includes the steps of:

modifying said conventional tooth working surface between said toe line and said first boundary line, wherein said amount of modification δ is determined in accordance with the following equations:

$$\delta = (\delta_T \cdot x^n)/x_A^n$$

where
- $\delta_T$—an amount of modification of any point T located on said toe line, a predetermined given value;
- $X_A$—a distance between said toe line and said first boundary line, a predetermined given value;
- x—a distance from said first boundary line to said arbitrary point N, known;
- n—any positive integer≠0;

modifying said conventional tooth working surface between said heel line and said second boundary line, wherein said amount of modification δ is determined in accordance with the following equations:

$$\delta = (\delta_H \cdot x^n)/x_B^n$$

where
- $\delta_H$—an amount of modification of any point H located on said heel line, a predetermined given value;
- $x_B$—a distance between said heel line and said second boundary line, a predetermined given value;
- x—a distance from said second boundary line to said arbitrary point N, known;
- n—any positive integer≠0;

modifying said conventional tooth working surface between said face line and said third boundary line, wherein said amount of modification δ is determined in accordance with the following equations:

$$\delta = (\delta_F \cdot x^n)/x_F^n$$

where
- $\delta_F$—an amount of modification of any point F located on said face line, a predetermined given value;
- $x_F$—a distance between said face line and said third boundary line, a predetermined given value;
- x—a distance from said third boundary line to said arbitrary point N, known;
- n—any positive integer≠0, and modifying said conventional tooth working surface between said root line and said forth boundary line, wherein said amount of modification δ is determined in accordance with the following equations:

$$\delta = (\delta_R \cdot x^n)/x_R^n$$

where
- $\delta_R$—an amount of modification of any point R located on said root line, a predetermined given value;
- $x_R$—a distance between said root line and said forth boundary line, a predetermined given value;
- x—a distance from said forth boundary line to said arbitrary point N, known;
- n—any positive integer≠0.

21. The method for making a forging die for manufacturing a conjugated gear having a predetermined gear tooth contact area as defined in claim 14, wherein said modified gear tooth surface is determined in accordance with the following equations:

$$\underline{r}^{(P)} = \underline{r}^{(N)} + \delta \underline{n},$$

where
- $\underline{r}^{(P)}$—a position vector of any arbitrary point P on said modified tooth working surface outside said predetermined gear tooth contact area represented in a Cartesian coordinate system x-y-z;
- $\underline{r}^{(N)}$—a position vector of any arbitrary point N on said conventional tooth working surface outside said predetermined gear tooth contact surface represented in the Cartesian coordinate system x-y-z, known;
- δ—an amount of modification of said arbitrary point N;
- $\underline{n}$—a unit normal vector of said arbitrary point N represented in the Cartesian coordinate system x-y-z, known.

22. The method for making a forging die for manufacturing a conjugated gear having a predetermined gear tooth contact area as defined in claim 21, wherein the step (3) includes the steps of:

modifying said conventional tooth working surface between said toe line and said first boundary line, wherein said amount of modification δ is determined in accordance with the following equations:

$$\delta = (\delta_T \cdot x^n)/x_A^n$$

where
- $\delta_T$—an amount of modification of any point T located on said toe line, a predetermined given value;
- $x_A$—a distance between said toe line and said first boundary line, a predetermined given value;
- x—a distance from said first boundary line to said arbitrary point N, known;
- n—any positive integer≠0, and modifying said conventional tooth working surface between said heel line and said second boundary line, wherein said amount of modification δ is determined in accordance with the following equations:

$$\delta = (\delta_H \cdot x^n)/x_B^n$$

where
- $\delta_H$—an amount of modification of any point H located on said heel line, a predetermined given value;
- $x_B$—a distance between said heel line and said second boundary line, a predetermined given value;
- x—a distance from said second boundary line to said arbitrary point N, known;
- n—any positive integer≠0.

23. The method for making a forging die for manufacturing a conjugated gear having a predetermined gear tooth contact area as defined in claim 21, wherein the step (3) includes the steps of:

modifying said conventional tooth working surface between said face line and said third boundary line, wherein said amount of modification δ is determined in accordance with the following equations:

$$\delta = (\delta_F \cdot x^n)/x_F^n$$

where
- $\delta_F$—an amount of modification of any point F located on said face line, a predetermined given value;
- $x_F$—a distance between said face line and said third boundary line, a predetermined given value;
- x—a distance from said third boundary line to said arbitrary point N, known;
- n—any positive integer≠0, and modifying said conventional tooth working surface between said root line and said forth boundary line, wherein said amount of modification δ is determined in accordance with the following equations:

$$\delta = (\delta_R \cdot x^n)/x_R^n$$

where
- $\delta_R$—an amount of modification of any point R located on said root line, a predetermined given value;
- $x_R$—a distance between said root line and said forth boundary line, a predetermined given value;
- x—a distance from said forth boundary line to said arbitrary point N, known;
- n—any positive integer≠0.

24. The method for making a forging die for manufacturing a conjugated gear having a predetermined gear tooth contact area as defined in claim 21, wherein the step (3) includes the steps of:

modifying said conventional tooth working surface between said toe line and said first boundary line, wherein said amount of modification δ is determined in accordance with the following equations:

$$\delta = (\delta_T \cdot x^n)/x_A^n$$

where
- $\delta_T$—an amount of modification of any point T located on said toe line, a predetermined given value;
- $x_A$—a distance between said toe line and said first boundary line, a predetermined given value;
- x—a distance from said first boundary line to said arbitrary point N, known;
- n—any positive integer≠0;

modifying said conventional tooth working surface between said heel line and said second boundary line, wherein said amount of modification δ is determined in accordance with the following equations:

$$\delta = (\delta_H \cdot x^n)/x_B^n$$

where
- $\delta_H$—an amount of modification of any point H located on said heel line, a predetermined given value;
- $x_B$—a distance between said heel line and said second boundary line, a predetermined given value;
- x—a distance from said second boundary line to said arbitrary point N, known;
- n—any positive integer≠0;

modifying said conventional tooth working surface between said face line and said third boundary line, wherein said amount of modification δ is determined in accordance with the following equations:

$$\delta = (\delta_F \cdot x^n)/x_F^n$$

where $\delta_F$—an amount of modification of any point F located on said face line, a predetermined given value;

$x_F$—a distance between said face line and said third boundary line, a predetermined given value;

x—a distance from said third boundary line to said arbitrary point N, known;

n—any positive integer≠0, and modifying said conventional tooth working surface between said root line and said forth boundary line, wherein said amount of modification δ is determined in accordance with the following equations:

$$\delta = (\delta_R \cdot x^n)/x_R^n$$

where $\delta_R$—an amount of modification of any point R located on said root line, a predetermined given value;

$x_R$—a distance between said root line and said forth boundary line, a predetermined given value;

x—a distance from said forth boundary line to said arbitrary point N, known;

n—any positive integer≠0.

* * * * *